United States Patent
Valentine et al.

(10) Patent No.: US 6,704,292 B1
(45) Date of Patent: Mar. 9, 2004

(54) USE OF REMOTE POLL TO FACILITATE DETERMINING NETWORK TOPOLOGY

(75) Inventors: Simon Peter Valentine, Hemel Hempstead (GB); Christopher Robert Linzell, St Albans (GB); Lee Anthony Walker, Watford (GB)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/447,090

(22) Filed: Nov. 22, 1999

(30) Foreign Application Priority Data

May 10, 1999 (GB) .............................................. 9910845

(51) Int. Cl.⁷ ............................................. H04L 12/28
(52) U.S. Cl. ..................................... 370/255; 370/449
(58) Field of Search ................................ 370/254, 255, 370/256, 257, 400, 401, 410, 252, 449

(56) References Cited

U.S. PATENT DOCUMENTS

| | | | |
|---|---|---|---|
| 4,545,013 A | 10/1985 | Lyon et al. .................. | 364/200 |
| 5,416,777 A | * 5/1995 | Kirkham | |
| 5,421,024 A | 5/1995 | Faulk, Jr. et al. ........... | 395/800 |
| 5,586,267 A | 12/1996 | Chatwani et al. ...... | 395/200.11 |
| 5,732,086 A | 3/1998 | Liang et al. ................ | 370/410 |
| 5,734,824 A | * 3/1998 | Choi | |
| 6,108,702 A | * 8/2000 | Wood | |
| 6,222,840 B1 | * 4/2001 | Walker et al. | |

FOREIGN PATENT DOCUMENTS

| | | | | |
|---|---|---|---|---|
| JP | 4-152733 | 5/1992 | .......... | H04L/12/00 |
| WO | WO 89/07377 | 8/1989 | .......... | H04M/15/26 |
| WO | WO 97/31458 | 8/1997 | .......... | H04L/12/56 |

* cited by examiner

*Primary Examiner*—Chi Pham
*Assistant Examiner*—Kamran Emdadi
(74) *Attorney, Agent, or Firm*—McDonnell Boehnen Hulbert & Berghoff

(57) ABSTRACT

Supervising a network (10), which network comprises a plurality of components (12, 13, 14) having ports at least some of which ports are connected by links to ports on other components, at least one component including means to ascertain the source addresses of the remote component or port to which each of its ports is connected when data is received from that remote component, including:

interrogating said at least one component to establish which ports of the component have received the address of the ports of the relevant remote component to which they are connected by a link;

and in respect of at least one of the other ports of said component, remotely polling the remote component to which it is connected via said port to cause said remote component to return a signal including the address to that port, whereby the source address of the relevant remote component or its port can be identified.

13 Claims, 3 Drawing Sheets

USE OF REMOTE POLL TO FACILITATE DETERMINING NETWORK TOPOLOGY

BACKGROUND OF THE INVENTION

The present invention relates to supervising a network, that is a network of electronic components comprising, for example, workstations, personal computers, servers, hubs, routers, bridges, switches, (hereinafter referred to as components of the network), and links between these components which may be in the form of physical cable or wireless links. The network may be a local area network (LAN), wide area network (WAN) or other types and may operate in accordance with any desired protocol.

After such a network has been installed, it is desirable for the person appointed network manager to be able to understand the technical operation of the network. In known network management systems, the manner in which the relevant data is retrieved from the managed devices, compiled and displayed has been problematic in several respects. Firstly, the data received from each of the managed devices is simply compiled and displayed as a list of data for the user to interpret. Secondly, the data does not provide information about unmanaged devices. Thirdly, information about a given network device, such as the type of device, location of the device on the network and operating speed of the device, may be contained in different sections of the compiled data. Consequently, conventional systems are cumbersome and difficult to use.

In co-pending UK patent applications numbers 9910843.3, 9910844.1, 9910838.3, 9910837.5, 9910839.1, 9910840.9, (each in the name of the assignee of the present application) which are incorporated herein, we describe various arrangements for providing automatic interrogation of the network to thereby produce a network map which may be displayed on a visual display unit showing the components and links between the components. At its simplest, and where the component is a "managed" component, this is usually provided by interrogation using a known protocol, such as the SNMP protocol, of the so-called 'agent' of each component which stores the components unique MAC address, the type of component and the MAC addresses the components which are connected to the ports directly or indirectly.

However, the agent of each component can only store the MAC address of the remote component (or the port address) to which a particular port is connected after it has received a signal originating from that remote component which includes the relevant address. Data signals usually carry both source and destination addresses but until the source address is received, it cannot be stored by the agent. In particular operations of the network, source address headed data may generally only pass in one direction. Thus there will be a number of ports which will not have received a signal sourced from the remote component to which they are attached and which therefore will not know the MAC address of that remote component. As a result, it is impossible to provide a network map or deduce properly the topology of the network as it is necessary to know which ports of which component are attached to each other.

The present invention seeks to address this problem.

It should also be noted that some components (usually switches and hubs) use the component address as a source address whereas other components (such as routers) use the port address as the sourced address.

SUMMARY OF THE INVENTION

The present invention relates to use of remote poll to facilitate determining network topology.

The present invention provides a method of supervising a network, which network comprises a plurality of components having ports, at least some of which ports are connected by links to ports on other components, at least one component including an agent to ascertain the source addresses of the remote component or port to which each of its ports is connected when data is received from the relevant remote component, said method comprising:

interrogating said at least one component to establish a group of any ports which do not have the source address of the relevant remote component or its port to which they are connected by a link;

and in respect of at least one of the ports of said group, remotely polling the remote component to which it is connected via said port to cause said remote component to return to that port a signal including the address, whereby the source address of the relevant remote component or its port can be identified.

The present invention also provides network supervising apparatus for supervising a network comprising a plurality of components having ports, at least some of which ports are connected by links to ports on other components, at least one component including an agent to ascertain the source addresses of the port of the remote component or port to which each of its ports is connected when data is received from the relevant remote component, said apparatus comprising:

a processor unit which interrogates said at least one component and establishes a group of any ports which do not have the source address of the relevant remote component or its port to which they are connected by a link;

and in respect of at least one of the ports of said group, remotely polls the remote component to which it is connected via said port to cause said remote component to return to that port a signal including the address, whereby the source address of the relevant remote component or its port can be identified.

The present invention also provides a computer program on a computer readable medium or embodied in a carrier wave for use in supervising a network comprises a plurality of components having ports, at least some of which ports are connected by links to ports on other components, at least one component including as agent to ascertain the source addresses of the port of the remote component or port to which each of its ports is connected when data is received from the relevant remote component, said program comprising:

program means for interrogating said at least one component to establish a group of any ports which do not have the source address of the relevant remote component or its port to which they are connected by a link;

program means for causing, in respect of at least one of the ports of said group, remote polling of the remote component which is connected via said port to cause said remote component to return to that port a signal including the address;

and program means to thereby identify the source address of the relevant remote component or its port.

The present invention also provides a computer program embodied in a carrier wave for use in supervising a network comprises a plurality of components having ports, at least some of which ports are connected by links to ports on other components, at least one component including as agent to ascertain the source addresses of the port of the remote component or port to which each of its ports is connected when data is received from the relevant remote component, said program comprising:

program means for interrogating said at least one component to establish a group of any ports which do not have the source address of the relevant remote component or its port to which they are connected by a link;

program means for causing, in respect of at least one of the ports of said group, remote polling of the remote component which is connected via said port to cause said remote component to return to that port a signal including the address; and program means to thereby identify the source address of the relevant remote component or its port.

BRIEF DESCRIPTION OF THE DRAWINGS

Preferred embodiments of the invention will now be described by way of example only with reference to the accompanying drawings in which.

DESCRIPTION OF THE PREFERRED EMBODIMENT

Figure 1:
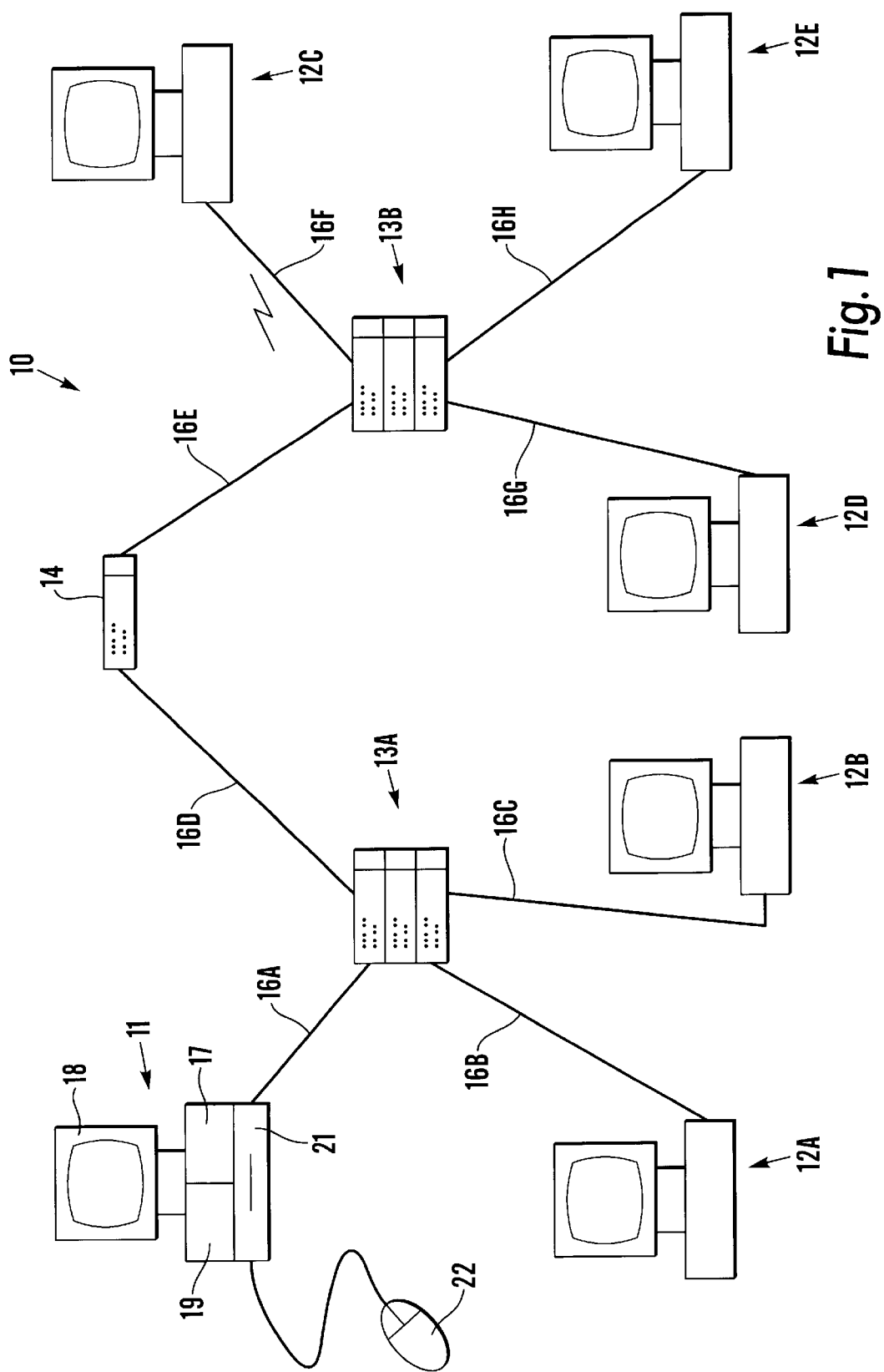
FIG. 1 is a diagrammatic view of a network incorporating a preferred embodiment of the invention.

Referring to FIG. 1 there is shown a network 10 comprising a plurality of components in the form of a network supervisor's workstation or computer 11, other workstations 12B–E, hubs 13A, 13B, and switch 14. The network is a simple network and is set out for purposes of illustration only. Other configurations and arrangements, may be used.

The components are connected together by means of links 16A–H which may be hard wired and utilise any desired protocol, and link 16F which is a wireless link.

The network supervisor's workstation includes, in addition to a visual display unit 18, a central processing unit or signal processor 19, a selector which may be in the form of a mouse 22, a program store 21 which may comprise, for example, a CD drive, a floppy disk drive or a zip drive, and a memory 17 for storing a program which may have been loaded from the program store 21 or downloaded for example via Internet from a website.

By means which is disclosed in the co-pending patent applications referred to above, the network supervisor's computer 11 may interrogate and analyse the network, and store in the memory 17 the information relating to the components within the network and the links between the components. In essence, most quality components include a so-called agent which stores information about the component such as its unique MAC number, its ID which identifies what the component is and what model type it is, how many ports it has and how they are connected directly or indirectly, and the address to which at least some of the ports are connected. The computer 11 interrogates the agents of each component.

Figure 2:
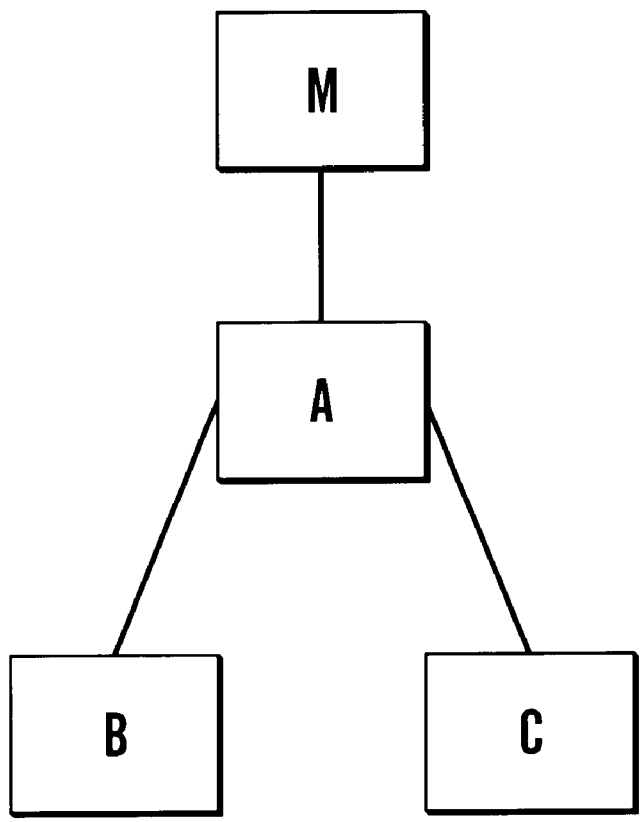
FIG. 2 is a detail of part of the network, and FIG. 3 sets out details of the program steps.

In order to clearly understand the invention it is necessary to understand a little more about the agent in managed components and the ports in those components. In managed components, each component or port will have a unique address. When that port directly communicates with another component (ie provides information originating with that port or its component—not simply forwarding or switching a signal received from elsewhere) it will forward its address to that component, (ie the source address—it forms part of the header of the data signal). Thus in the part of the network illustrated in FIG. 2, component M is connected by a link to component A, and component A is connected by links to components B and C, (for the purpose of this explanation we are ignoring other parts of the network). A, B and C are switches and M is a management station (eg the network supervisor's computer 11). Typically, M will be the only component to directly communicate with A, B and C, (interrogating them for management information). Consequently, packets that have as a source address A, B or C will always be going in the direction of M. This means that A will learn the addresses of B and C, but B and C will not learn the address of A.

In order to determine the topology of the network it is necessary to interrogate each managed component to establish for each port, the MAC address of the remote component or port to which it is connected. However, as set out above, components B and C will not know the address of A because data originating from A has not passed in that direction.

It is thus impossible to accurately construct a network tree with any degree of certainly in this situation because some of the information is missing. This situation arises in a switched environment where data commonly passes in one direction only rather than a shared environment in which packets of data are forwarded on all ports.

The present invention provides an arrangement to deal with this problem. During the initial interrogation phase when the computer M is interrogating all of the components of the network so as to determine their interconnections and to produce a network tree, it will interrogate the agent of each component which in the case of B and C will have incomplete information, that is, it will not know the address of A. In order to force B and C to learn the MAC addresses of A, we use remote poll (PING). By remote polling, one effectively drives the remote component to send a signal back to oneself This can be done selectively in order to obtain just enough information to build the tree. In the example shown in FIG. 2, it will be sufficient to direct B to PING A and for C to PING A.

In essence, M will access the agent of component A, to determine that A is connected to B and C. It will then interrogate the agent of B, determine that the component to which it is connected is undetermined, the program will cause B to PING A thereby causing it to return a signal to B at which point the agent of B will be able to determine the address A to which B is connected. A similar procedure is carried out with regard to component C.

There are cases where the relevant port of a managed component does not in fact remember addresses or that address function has been switched off Therefore the port will never learn the MAC addresses of any of the other managed components.

In such a case, if the component meets the following three criteria:

1. address learning is disabled on one port only,
2. remote poll is successful between that component and a second component,
3. the component still does not learn the MAC address of the second component.

then it can be assumed that it must be the non-learning port that is linked directly or indirectly to the second component. This can be used in establishing the topology of the network.

We have described how the network may be supervised. The method of the invention may be carried out under the control of the network supervisor's workstation or computer and in particular by means of a program controlling the signal processor apparatus of that computer or elsewhere in the system.

The program for controlling the operation of the invention may be provided on a computer readable medium, such as a CD, or a floppy disk, or a zip drive disk carrying the program or their equivalent, or may be provided on a computer or computer memory carrying the website of, for example, the supplier of the network products. The program may be downloaded from whichever appropriate source via, for example, a telephone line, a wireless radio or infra-red link, in each of which case it may be embodied in a carrier wave and used to control the processor to carry out the steps of the invention as described.

Figure 3:
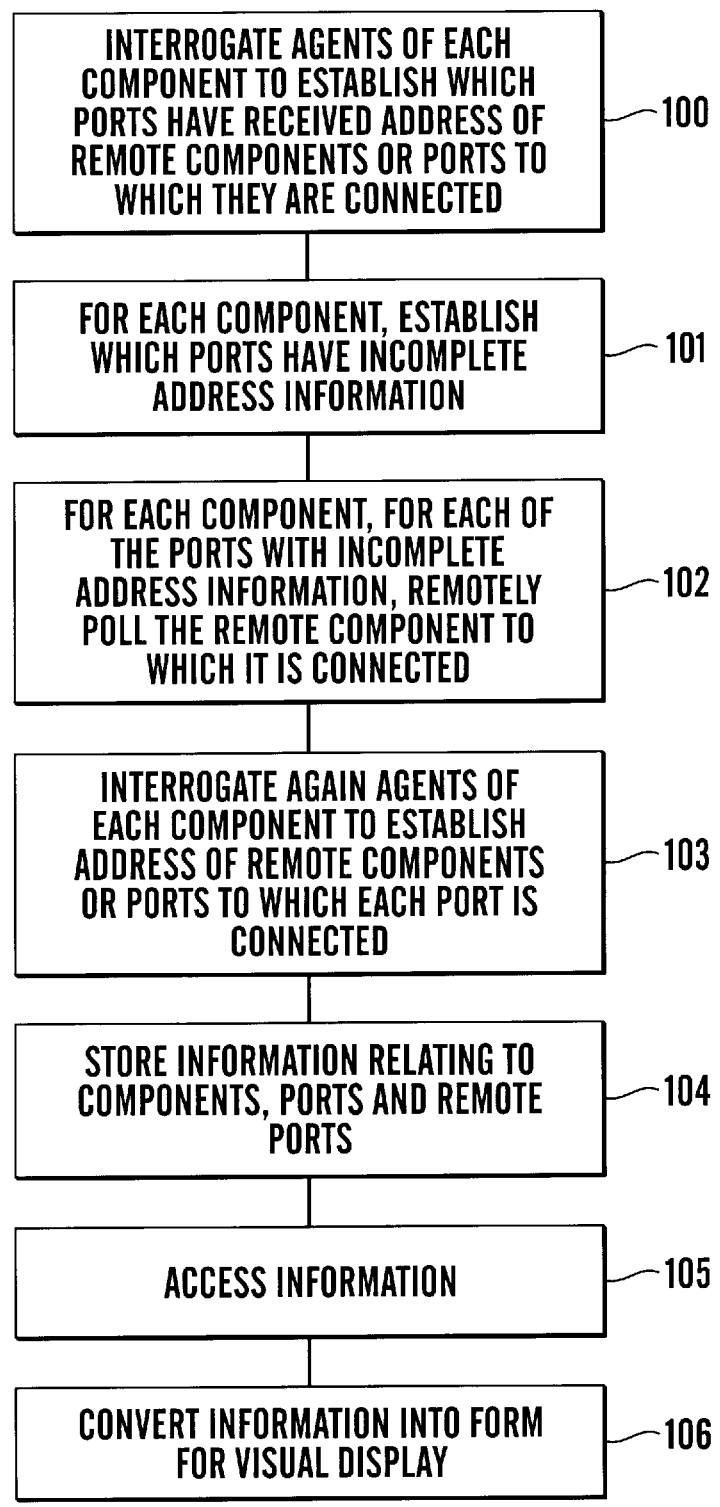

The program may include (see FIG. 3), program means (100) for interrogating said at least one component to establish which ports of the component have an address of a remote component to which they are attached by a link, program means (101) for establishing, for each component, which ports have incomplete address information, program means (102) for causing, in respect of these ports with incomplete address information, remote polling of the remote component via the relevant port to cause said remote component to return a data signal with source address to that port, program means (103) for interrogating the component again to establish the addresses of the remote component or ports to which each port is connected, program means (104) to cause the information to be stored, program means (105) to access that information, and program means (106) to convert the information into a form for visual display.

The invention is not restricted to the details of the foregoing example.

What is claimed is:

1. A method of supervising a network, which network comprises a plurality of components having ports, at least some of which ports are connected by links to ports on other components, at least one component including a non-learning port and further including an agent to ascertain and store the source addresses of remote components or ports to which at least some of its ports are connected when data is received from the relevant remote component, said method comprising:

interrogating said at least one component to establish a group of any ports which do not have the source address of the relevant remote component or its port to which they are connected by a link;

in respect of at least one of the ports of said group, remotely polling the remote component to which it is connected via said port to cause said remote component to return to that port a signal including the address, whereby the source address of the relevant remote component or its port can be identified and stored, determining that a non-learning port is connected to the remote component if after remote polling, no port stores an address of the remote component, and including in a network topology any such returned and stored addresses and any such non-learning port connections.

2. A method as claimed in claim 1 in which remote polling is carried out in respect of all of the ports of the group of ports.

3. A method as claimed in claim 1 including deducing the topology of the network including the links between each component by identifying the addresses of the components or ports to which each port of each component is connected.

4. A computer program on a computer readable medium, said computer program comprises software for performing the steps of claim 1.

5. Network supervising apparatus for supervising a network comprising a plurality of components having ports, at least some of which ports are connected by links to ports on other components, at least one component including a non-learning port and further including an agent to ascertain and store the source addresses of the port of remote components or ports to which at least some of its ports are connected when data is received from the relevant remote component, said apparatus comprising:

a processor unit which interrogates said at least one component and establishes a group of any ports which do not have the source address of the relevant remote component or its port to which they are connected by a link;

in respect of at least one of the ports of said group, remotely polls the remote component to which it is connected via said port to cause said remote component to return to that port a signal including the address, whereby the source address of the relevant remote component or its port can be identified and stored;

determines that the remote component is connected to a non-learning port if after remote polling, no port stores an address of the remote component, and includes in a network topology any such returned and stored addresses and any such non-learning port connections.

6. Apparatus as claimed in claim 5 in which the processor unit carries out remote polling in respect of the other ports of the group of ports.

7. Apparatus as claimed in claim 5 in which the processor unit deduces the topology of the network including the links between each component by identifying the addresses of the components or ports to which each port of each component is connected.

8. A computer program on a computer readable medium for use in supervising a network comprises a plurality of components having ports, at least some of which ports are connected by links to ports on other components, at least one component including a non-learning port and further including an agent to ascertain and store the source addresses of the port of remote components or ports to which at least some of its ports are connected when data is received from the relevant remote component, said program comprising:

program means for interrogating said at least one component to establish a group of any ports which do not have the source address of the relevant remote component or its port to which they are connected by a link;

program means for causing, in respect of at least one of the ports of said group, remote polling of the remote component which is connected via said port to cause said remote component to return to that port a signal including the address;

program means to thereby identify and store the source address of the relevant remote component or its port;

program means to determine that the remote component to which that port is attached is connected to a non-learning port if, after remote polling, no port stores an address of the remote component;

and programs means to include in a network topology any such returned and stored addresses and any such non-learning port connections.

9. A computer program as claimed in claim 8 in which remote polling is carried out in respect of all the ports of the group of ports.

10. A computer program as claimed in claim 8 including program means to deduce the topology of the network including the links between each component by identifying the addresses of the components or ports to which each port of each component is connected directly or indirectly.

11. A computer program embodied in a carrier wave for use in supervising a network comprises a plurality of components having ports, at least some of which ports are connected by links to ports on other components, at least one component including a non-learning port and further including an agent to ascertain and store the source addresses of the port of remote components or ports to which at least some of its ports are connected when data is received from the relevant remote component, said program comprising:

- program means for interrogating said at least one component to establish a group of any ports which do not have the source address of the relevant remote component or its port to which they are connected by a link;

- program means for causing, in respect of at least one of the ports of said group, remote polling of the remote component which is connected via said port to cause said remote component to return to that port a signal including the address;

- program means to thereby identify and store the source address of the relevant remote component or its port;

- program means to determine that the remote component to which that port is attached is connected to a non-learning port if, after remote polling, no port stores an address of the remote component;

- and program means to include in a network topology any such returned and stored addresses and any such non-learning port connections.

12. A computer program as claimed in claim 11 in which remote polling is carried out in respect of all the ports of the group.

13. A computer program as claimed in claim 11 including program means to deduce the topology of the network including the links between each component by identifying the addresses of the components or ports to which each port of each component is connected directly or indirectly.

* * * * *